INVENTORS
WILLIAM T. TIERNEY, JR.
JAMES F. KINCAID
BY
J.H. Graham
ATTORNEY

INVENTORS
WILLIAM T. TIERNEY, JR.
JAMES F. KINCAID
BY
*J.V. Graham*
ATTORNEY

United States Patent Office 2,768,617
Patented Oct. 30, 1956

2,768,617

AIR INDUCTION SYSTEM FOR AIR SWIRL INTERNAL COMBUSTION ENGINES

William T. Tierney, Jr., Hopewell Junction, and James F. Kincaid, Beacon, N. Y., assignors to The Texas Company, New York, N. Y., a corporation of Delaware Application October 16, 1952, Serial No. 314,984

6 Claims. (Cl. 123—191)

This invention relates to an air intake passage and port and its valve for an induction air swirl internal combustion engine.

Induction air swirl internal combustion engines are engines in which the intake air charge is caused to rotate within the combustion chamber, usualy about a single predetermined axis, in the manner of the rotation of a solid body. Such swirling of the air charge has numerous advantages, among which is that of contributing to knock-free combustion, when combined with certain other features as taught in the patent of E. M. Barber, 2,484,009. Engines employing induction air swirl, however, often suffer from the disadvantage of a loss in volumetric efficiency, particularly at high engine speeds and high air swirl rates, due to friction losses in the intake air resulting from the specialized configuration of the intake air passage used to produce the swirling motion of the air.

In the copending application of C. F. Taylor et al., Serial No. 258,374, filed Nov. 27, 1951, now issued as Patent Number 2,680,431, there is disclosed an intake passage and port and its valve for induction air swirl engines which will provide at high engine speeds both satisfactory volumetric efficiency and a desired level of air swirl rate. The present invention embodies an improvement over the structure disclosed therein, and relates to specific intake passage and port and valve structure which not only possesses the characteristics shown in the aforesaid application to be desirable, but which is also characterized by simplicity, ease and inexpensivenesses of manufacture, improved suitability for cooling, and particular suitability for ready adaptation to conventional engine structure.

It is an object of this invention therefore to provide an intake passage and port and valve therefor which will enable operation of an induction air swirl internal combustion engine at high engine speeds and high swirl rates with a high level of volumetric efficiency.

It is another object to provide an intake passage and port and valve therefor having reduced fluid friction losses.

Another object is to provide an intake passage and port and valve therefor which is of simple form and can be easily and inexpensively manufactured.

It is another object to provide an intake passage and port and its valve for directing the intake air into the engine combustion chamber in a closely confined stream having a pronounced directivity in a desired direction.

Another object is to provide an intake passage and port and valve therefor which is particularly suitable for incorporation in conventional engine structure.

Another object is to provide an intake passage and port and valve therefor which is particularly suitable for ease of cooling.

Another object is to provide an intake passage and port and valve therefor which is particularly suitable for air flow with reduced turbulence.

These and other objects of this invention will be apparent from a consideration of the following description taken in conjunction with the accompanying drawings which disclose one embodiment of the invention. It will be understood that the details of construction and arrangement of parts shown and described may be varied without departing from the spirit of the invention, for a definition of the limits of which reference should be made to the appended claims.

Figure 1:
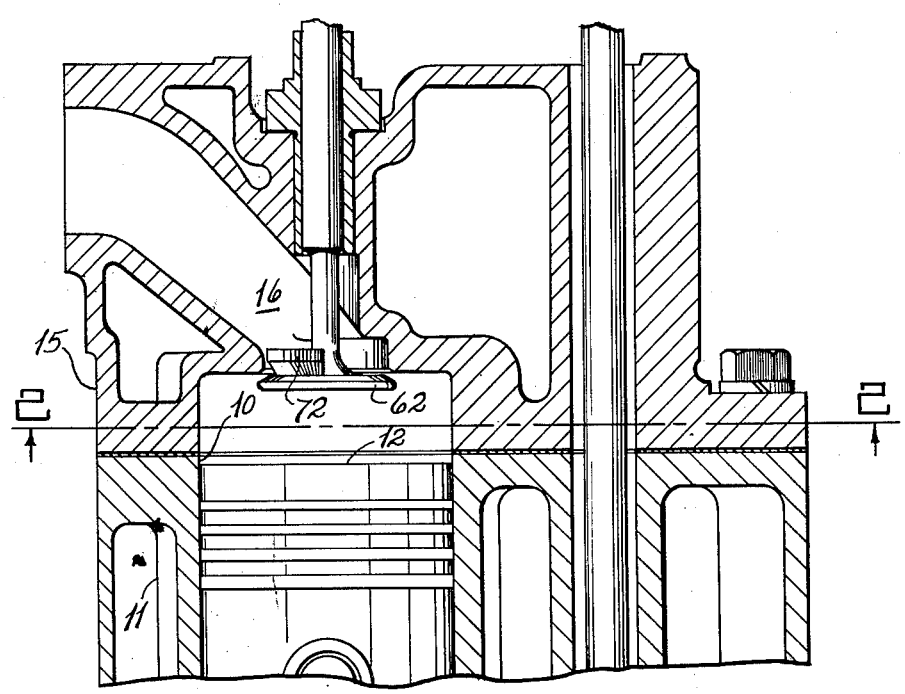
Fig. 1 is a sectional view of a portion of an internal combustion engine, showing the environment of the present invention, the view being taken on the plane of line 1—1 of Fig. 2.
Figure 2:
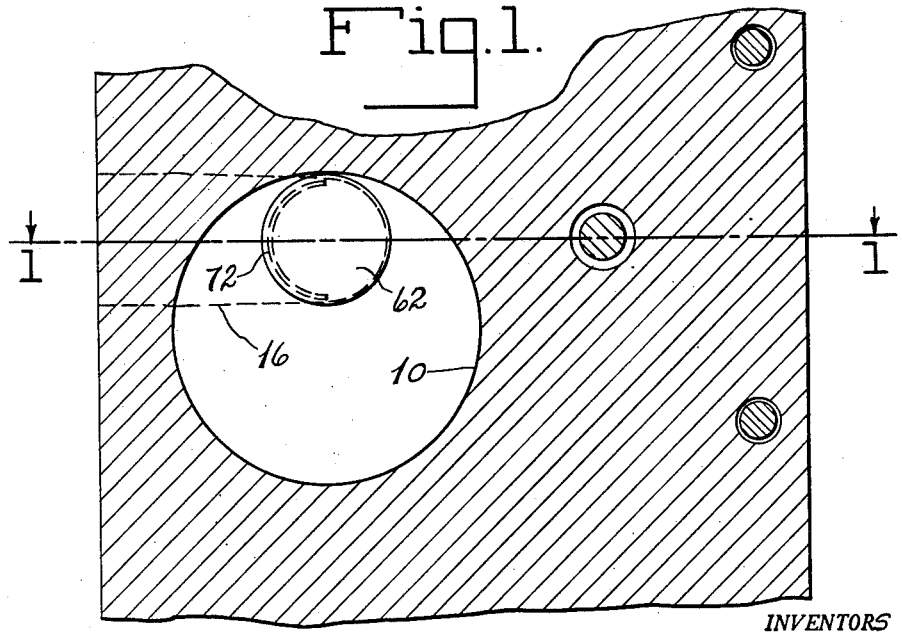
Fig. 2 is a horizontal sectional view taken on the plane of line 2—2 of Fig. 1.

Referring to Figs. 1 and 2 of the drawing, an engine cylinder is shown at 10 provided with water jacket 11, piston 12 and a connecting rod, not shown, which is attached to the usual crankshaft, not shown.

Engine cylinder 10 is closed at its top by a cylinder head 15 having an intake passage 16, through which is drawn during the suction stroke of piston 12, the air or equivalent fuel oxidizing agent necessary to support combustion. It is with this passage and its configuration and the intake port and valve with which it is provided in an engine requiring induction air to swirl around the combustion chamber, that the present invention is concerned.

Figure 3:
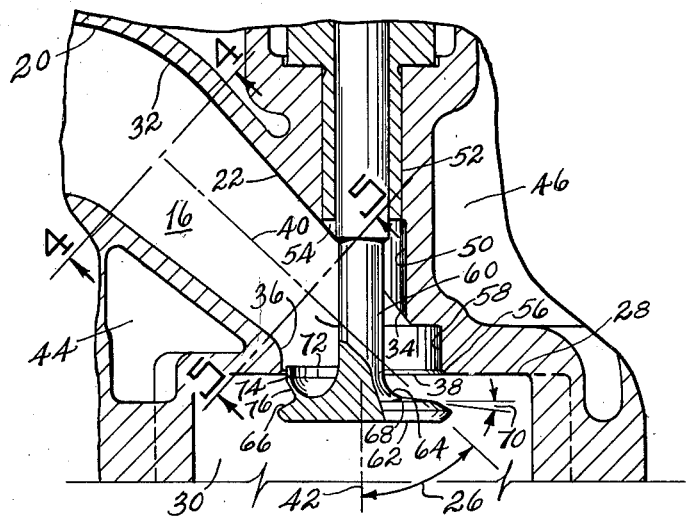
Fig. 3 is an enlarged view of a portion of Fig. 1.

As shown more particularly in Fig. 3, an intake passage constructed in accordance with the present invention includes an inlet portion or end 20, which is of circular cross section, and is shown horizontally oriented for easy connection to conventional air intake manifold structure, not shown. Adjacent the inlet end 20 is an intermediate portion 22 which is generally tapered in vertical profile and disposed at an angle to the plane of the top 28 of the combustion chamber 30. A gradually curved elbow portion 32 provides a smoothly faired connection between the inlet end 20 and the intermediate portion 22 to produce a smooth walled air flow passage free of abrupt variations in cross-sectional area or other discontinuities.

The intermediate portion 22 is largest at the end which joins the elbow portion 32 and has a gradually tapering profile in the plane of Figure 3, providing a cross-sectional area which decreases slowly and smoothly as it approaches the combustion chamber 30, and becomes progressively deformed from circular by being flattened into a generally lopsided circular cross section, the greater part of which, including a lower half, is circular, and the remainder thereof is defined by varying arcs having radii of curvature of different dimensions forming an approximate semi-ellipse for the upper part and having the major dimension parallel to the combustion chamber top 28. The intermediate portion 22 is, in turn, joined at its smaller end to the outlet portion 34 of the intake passage. The outlet portion 34 is of irregular shape in cross section, being defined by arcs having different radii of curvature, the flatter arcs being along the top and bottom surfaces of the passage to form a generally elliptical cross section at the point where it joins the intermediate portion, varying progressively to a flatter generally elliptical cross section as it approaches the combustion chamber 30, and being faired at the passage outlet end 36 to a smooth termination into an orifice or port 38 of circular cross section leading into the combustion chamber.

Both intermediate and outlet portions 22 and 34 have a common substantially straight line flow axis 40, and together form a smooth-walled tubular air flow passage having a substantially straight line profile, tapering gradually in the plane of Fig. 3 in the direction of air flow, whose side walls, though defining a cross section which increases in ellipticity in the direction of air flow, are generated with substantially straight lines. The common axis 40 of the intermediate and outlet portions is disposed at an acute angle 26, preferably 35° to 45°, relative to the axis 42 about which it is desired to have the air swirl, and lies in a single plane parallel to this swirl axis 42. In general, optimum performance is obtained when this plane is arranged to be tangential to the direction of air swirl, i. e., perpendicular to the radius of the combustion chamber, in the embodiment shown, through the outlet end 36 of the intake passage. The preferred size of acute angle 26 provides ample space on the underside of the intake passage for a cooling water jacket 44, which in combination with water jacket 46 on the opposite side of orifice 38, affords improved cooling of the surfaces surrounding the air flow path, and prevents excessive heating of the intake air charge. This feature is an important attribute of the present invention, since excessive heating of the intake air seriously decreases the weight of the air charge taken into the engine cylinder during a piston intake stroke, and this decreases engine volumetric efficiency.

Figure 4:
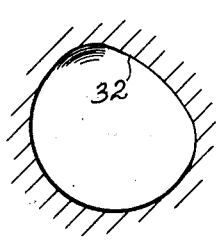
Fig. 4 is a sectional view taken on line 4—4 of Fig. 3.
Figure 5:
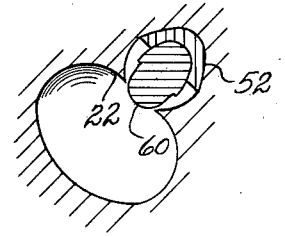
Fig. 5 is a sectional view taken on line 5—5 of Fig. 3.

The intake passage is thus characterized by a minimum of directional change of the air as it flows throughout the length thereof. This is particularly evident from a consideration of Figs. 4 and 5 of the drawings which show cross-sectional views of the intake passage at lines 4—4 and 5—5 respectively, and which clearly illustrate the smooth and gradual nature of the change of the passage cross-sectional area. Fig. 4 shows the generally lop-sided circular or somewhat semi-circular, semi-elliptical shape of the intake passage cross section at the point of junction between the curved elbow portion 32 and the intermediate portion 22, while Fig. 5 shows the more flattened and generally elliptical shape of the cross section at the point of junction between the smaller end of the intermediate portion 22 and the outlet portion 34.

Closely adjacent the junction of the intermediate portion 22 and the outlet portion 34, and directly opposite the combustion chamber orifice or port 38, the inlet passage has in its upper wall surface a counterbore 50 which is perpendicular to the top 28 of the combustion chamber 30, and is adapted to receive a valve stem guide 52 for supporting the stem of a poppet intake valve, hereinafter described. The valve stem guide 52 in counterbore 50 is preferably made without the boss which conventionally surrounds it on its upstream side 54 and projects into the air flow passage. Also valve stem guide 52 is cut back as shown, or may be ground flush with the inlet passage wall surface, to prevent the protrusion of its upstream side into the air flow path. Elimination of this boss or any protruding portion of valve stem at this point avoids any abrupt discontinuity in the air stream direction and cross-sectional area, and thus eliminates the turbulence and friction losses usually incurred at this point.

At its outlet end 36 of passage 16, adjacent the top 28 of the combustion chamber 30, the outlet portion 34 is chamfered to provide a tapered seat 56 for the intake valve, and is also provided with a counterbore 58 for reasons which will appear hereinafter.

Reciprocably mounted in the valve stem guide 52 is a valve stem 60 which carries a generally disc-shaped poppet intake valve 62. That portion of the valve stem 60 normally within the intake air stream preferably should not exceed in diameter ¼–⅕ the diameter of valve 62. The valve stem 60 is filleted at 64 where it joins the valve. This fillet radius is conventionally known as the valve tulip radius, and preferably should be slightly less than the valve stem diameter. The intake valve 62 is preferably oriented parallel to the combustion chamber top 28, and is provided with the usual chamfer 66 for cooperating with the valve seat 56 to seal off the intake passage from the combustion chamber when closed. The upper side 68 of the valve, i. e., that which faces into the intake passage, is preferably not flat, but is slightly conical, sloping upward toward the center. The base angle 70 of the cone, conventionally known as the valve tulip angle, preferably should have a value of from 5–12°.

On its upper side 68, the valve 62 carries a shroud 72, which is of generally semi-cylindrical shape and is disposed concentrically with the valve stem 60 and adjacent the periphery of the valve. The shroud consists of a semi-annular portion 74 having sides substantially perpendicular to the plane of the valve, supported from the valve by a semi-frusto conical portion 76 having its smaller edge adjacent the inside edge of the valve seating surface 66. Preferably the shroud 72 extends from 150° to 180° about the valve.

Valve 62 and valve stem 60 are normally rotatively positioned within the valve stem guide 52 so that the shroud 72 is centered on the valve 62 at a point diametrically opposite the direction toward which the incoming air is flowing. Thus, the valve 62 is normally rotatively positioned to place the ends of the shroud on a line which is perpendicular to the vertical plane of the intake air flow axis. Counterbore 58 is provided to allow full 360° rotation of valve 62 and shroud 72 about the valve stem axis, for ease in lapping valve and seat together. The height of the shroud 72 should preferably substantially equal the maximum valve lift so that when the valve 62 is open to maximum lift, the top of the shroud lies substantially in the plane of the orifice or port 38. Valve 62 and shroud 72 thereby cooperate to limit the flow area past the valve 62 to a value less than the minimum cross-sectional area upstream, so that the flow area of the intake port is minimized at the valve location, and intake air flow velocity increases progressively through the length of the intake passage to a maximum at the point where the intake air enters the combustion chamber.

With the configuration of intake passage and its port and valve described, there is provided an inlet air passageway in which the air experiences a minimum of directional change as it flows throughout the length of the passage, and is conducted into the combustion chamber in the proper direction for good swirl performance. Moreover, whatever changes in inlet air direction are necessary are made slowly and smoothly, reducing turbulence in the air stream, and resulting frictional losses, to a minimum. The location and shape of the shroud 72, in cooperation with the configuration of valve 62, results in blocking off that portion of the outlet orifice or port 38 diametrically opposite to the desired direction of inlet air flow, and minimizes turbulence in the flow past the valve stem 60 and into the combustion chamber 30, while maintaining the air stream in confined streamline flow through the open section of the orifice or port 38 on the opposite side of the shroud 72. The position of the shroud 72 and valve 62 when open, with relation to the orientation of the axis 40 of the intake port intermediate and outlet portions, as well as the provision for gradually reducing the flow passage area to a minimum at the valve location in the manner of a converging nozzle, all combine to impart high velocity and pronounced directivity to the inlet air stream in a direction substantially coincident with the axis 40 of the intake port, and having the desired acute angle 26 with the swirl axis 42, so as to produce the desired high swirl velocity around the combustion chamber 30.

Thus, there has been shown and described an intake passage and port and valve configuration therefor which provides in an induction air swirl internal combustion engine the desirable operational characteristics of pronounced directivity of a confined stream of inlet air, together with a minimum of turbulence and fluid friction losses in the inlet air stream, thereby achieving high flow velocity at the least expense in pressure drop, and enabling engine operation at high speeds and high air swirl rates with a minimum loss of volumetric efficiency.

Obviously, many modifications and variations of the invention, as hereinbefore set forth, may be made without departing from the spirit and scope thereof, and therefore only such limitations should be imposed as are indicated by the appended claims.

We claim:

1. An improved air induction system for providing air swirl about a predetermined swirl axis in the combustion chamber of a cylinder of an internal combustion engine, said swirl axis being substantially coincident with the longitudinal axis of said cylinder, comprising an intake passage having an outlet end terminating as the intake port of said combustion chamber and having a substantially straight line flow axis extending therethrough and into said combustion chamber and a smoothly decreasing cross section in the direction of flow changing gradually in shape from that of a generally lopsided circle to generally elliptical of increasing flatness with the major dimension thereof lying in a plane perpendicular to said swirl axis to provide streamlined flow therethrough with a minimum of turbulence and friction losses, the intake passage flow axis lying in a plane parallel to said swirl axis and tangential to the direction of air swirl and being disposed at an acute angle relative to he swirl axis, a poppet valve adapted to be reciprocated into closed and opened relationship with said outlet end of said intake passage at said port, and a semi-cylindrical shroud carried by said poppet valve on the upstream face thereof for minimizing the flow area of said intake passage at said outlet end thereby to maximize the flow velocity in said passage at said outlet end.

2. An improved air induction system as in claim 1, wherein said acute angle varies from 35° to 45°, and wherein said intake passage is provided with a cylindrical counterbore at its outlet end thereby furnishing a clearance space within which said valve with its semi-cylindrical shroud may be rotated through 360° when said passage is closed by said valve.

3. An improved air induction system as set forth in claim 1, wherein said intake passage has its outlet end faired smoothly into an orifice of circular cross section leading into said combustion chamber, said poppet valve is disc-shaped and adapted to close said orifice and restrict the area of flow past said valve to less than the minimum cross-sectional area of said intake passage.

4. In an internal combustion engine of the reciprocating piston type operating with induction air swirl, the combination of a cylinder having a disc-shaped combustion space and an air induction system for providing substantially solid body type of air swirl about the longitudinal axis of said combustion space comprising a tubular air flow passage with an outlet end and having a substantially straight line flow axis extending through said passage and outlet end and into said combustion space and a cross section smoothly decreasing in area in the direction of air flow while varying in shape from circular to lopsided circular to generally elliptical with increasing flatness with the major dimension being in a plane perpendicular to said combustion space axis, said intake port axis being disposed at an acute angle relative to said axis of said combustion space and lying in a plane parallel thereto and perpendicular to the combustion space radius through the outlet end of said intake passage, a poppet valve adapted to be reciprocated into closed and opened relationship with said outlet end of said intake passage, and a semi-cylindrical shroud carried by said poppet valve on its upstream face for minimizing the flow area of said intake passage at said outlet end when said valve is open, said lopsided circular cross section being defined by a circular arc along the lower part and by varying arcs having different radii of curvature along the upper part, and the generally elliptical cross section being defined by arcs having different radii of curvature, the flatter arcs having the larger radii of curvature defining the upper and lower parts of said generally elliptical cross section.

5. The combination of a cylinder of an internal combustion engine and an air induction system as defined by claim 4, wherein a fluid coolant passage is positioned between the end wall of said combustion space and said tubular air flow passage, said passage has its outlet end faired smoothly into an orifice of circular cross section leading into said combustion space, the wall of said passage opposite said orifice has a counterbore, and the disc-shaped poppet valve for said orifice has a valve stem mounted in said counterbore and a semi-cylindrical shroud supported coaxially with said valve stem and located adjacent the periphery of said valve and disposed about the upstream edge of the upstream face of said valve to restrict the flow area past said valve to less than the minimum cross section area of said passage.

6. The combination as defined in claim 5, wherein the sides of said air flow passage are generated by substantially straight lines, said acute angle varies from 35° to 45°, said shroud extends from 150° to 180° about said valve periphery and has a height substantially equal to the maximum lift of said valve, and the outlet end of said air flow passage at said orifice is counterbored to provide a clearance space for 360° rotation of said shroud about said valve stem axis.

References Cited in the file of this patent

UNITED STATES PATENTS

| 1,835,490 | Hesselman | Dec. 8, 1931 |

FOREIGN PATENTS

| 753,729 | France | Oct. 23, 1933 |
| 497,498 | Great Britain | Dec. 21, 1938 |
| 567,608 | Great Britain | Feb. 22, 1945 |
| 589,602 | Great Britain | June 25, 1947 |